United States Patent

Hopkins et al.

[15] 3,686,837
[45] Aug. 29, 1972

[54] DUAL MEDIA AIR FILTER

[72] Inventors: John D. Hopkins, Franksville; James C. McLaren, Racine; Ronald A. Johnson, Racine; Robert J. Offer, Racine, all of Wis.

[73] Assignee: Walker Manufacturing Company, Racine, Wis.

[22] Filed: Feb. 7, 1969

[21] Appl. No.: 797,466

[52] U.S. Cl. .................. 55/487, 55/250, 55/498, 55/510, 55/511, 55/521, 55/528, 210/493
[51] Int. Cl. .............................................. B01d 25/00
[58] Field of Search .............. 55/276, 250, 485–488, 55/498, 502, 503, 504, 510, 511, 501, 521, 528; 210/493; 156/205, 208, 213, 216, 224

[56] References Cited

UNITED STATES PATENTS

| | | |
|---|---|---|
| 2,537,992 | 1/1951 | Gross et al. .................. 210/493 |
| 2,720,279 | 10/1955 | James .......................... 55/498 |
| 3,290,870 | 12/1966 | Jensen ......................... 55/486 |
| 3,293,830 | 12/1966 | McKinlay ..................... 55/498 |
| 3,298,149 | 1/1967 | Sobeck ......................... 55/259 |
| 3,339,533 | 9/1967 | Nordstrom ................... 55/485 |
| 3,353,341 | 11/1967 | Stripp .......................... 55/276 |
| 3,474,599 | 10/1969 | Schwob ....................... 55/497 |
| 2,002,936 | 5/1935 | Davies ......................... 55/499 |
| 2,576,864 | 11/1951 | Valente ...................... 210/491 |
| 3,570,223 | 3/1971 | Svoren ........................ 55/528 |

FOREIGN PATENTS OR APPLICATIONS

| | | | |
|---|---|---|---|
| 239,122 | 6/1962 | Australia ..................... 55/510 |
| 1,250,201 | 11/1960 | France ........................ 55/521 |

*Primary Examiner*—Bernard Nozick
*Attorney*—Harness, Dickey & Pierce

[57] ABSTRACT

An air filter construction that provides a high capacity and high efficiency and is suitable for use with high performance automobile internal combustion engines includes a dual filter media in which a semi-rigid fibrous depth filter element is located on the upstream side and the downstream face of the element bears against pleats formed in a pleated paper material. The outer edges of the pleated paper are compressed and joined to the depth element in an air tight compression seal that may be mounted on suitable ledges inside of a suitable air filter housing.

7 Claims, 18 Drawing Figures

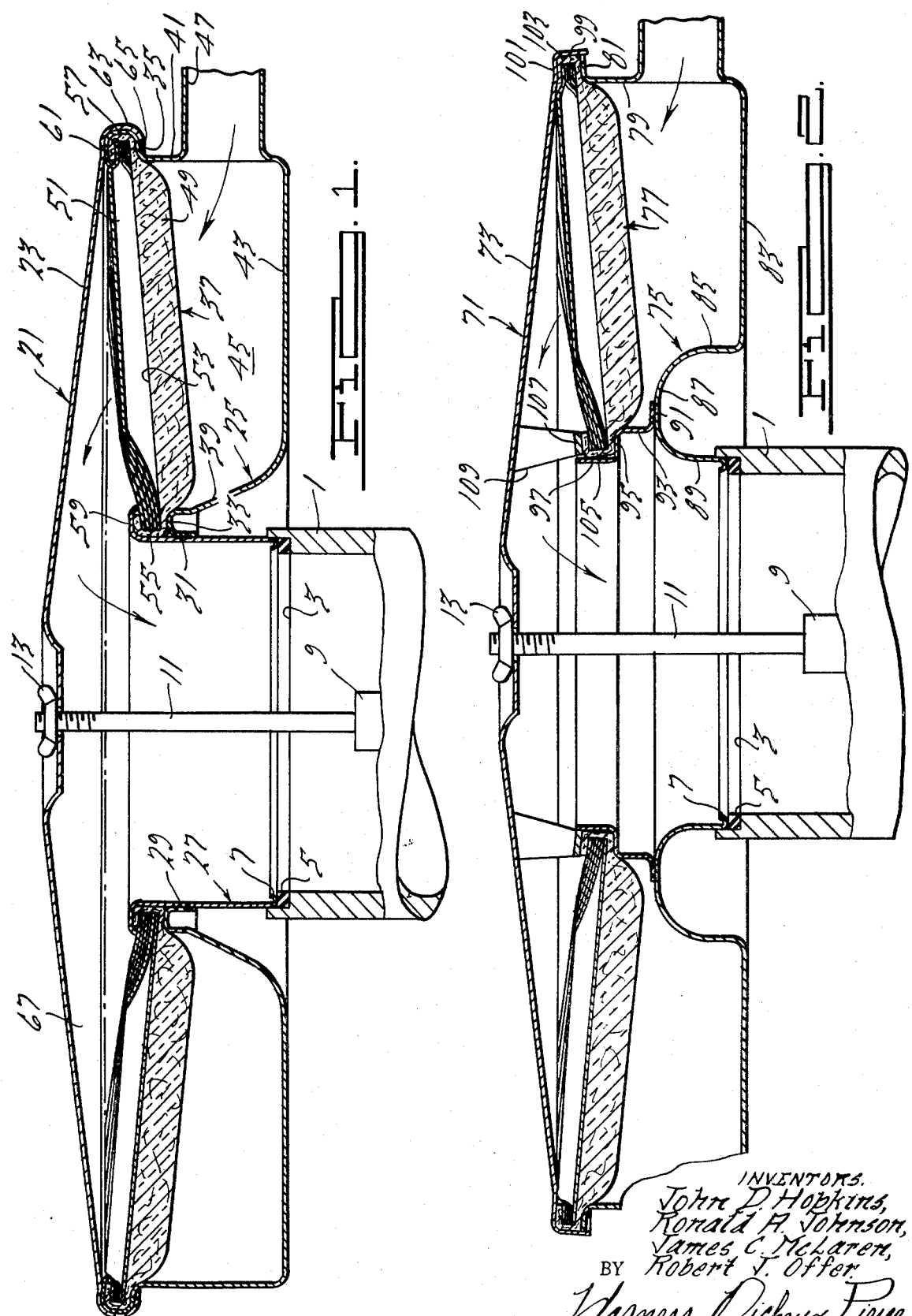

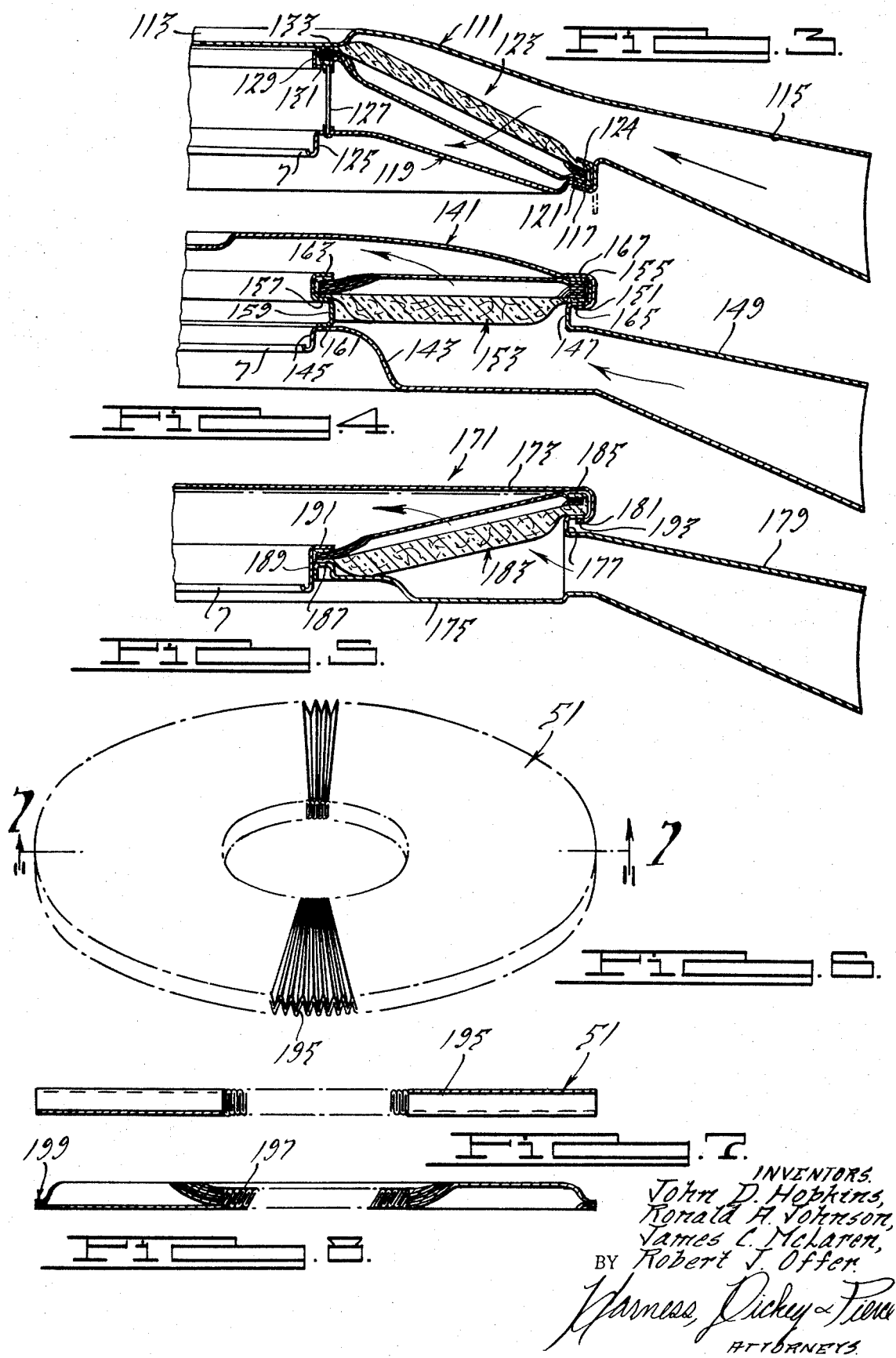

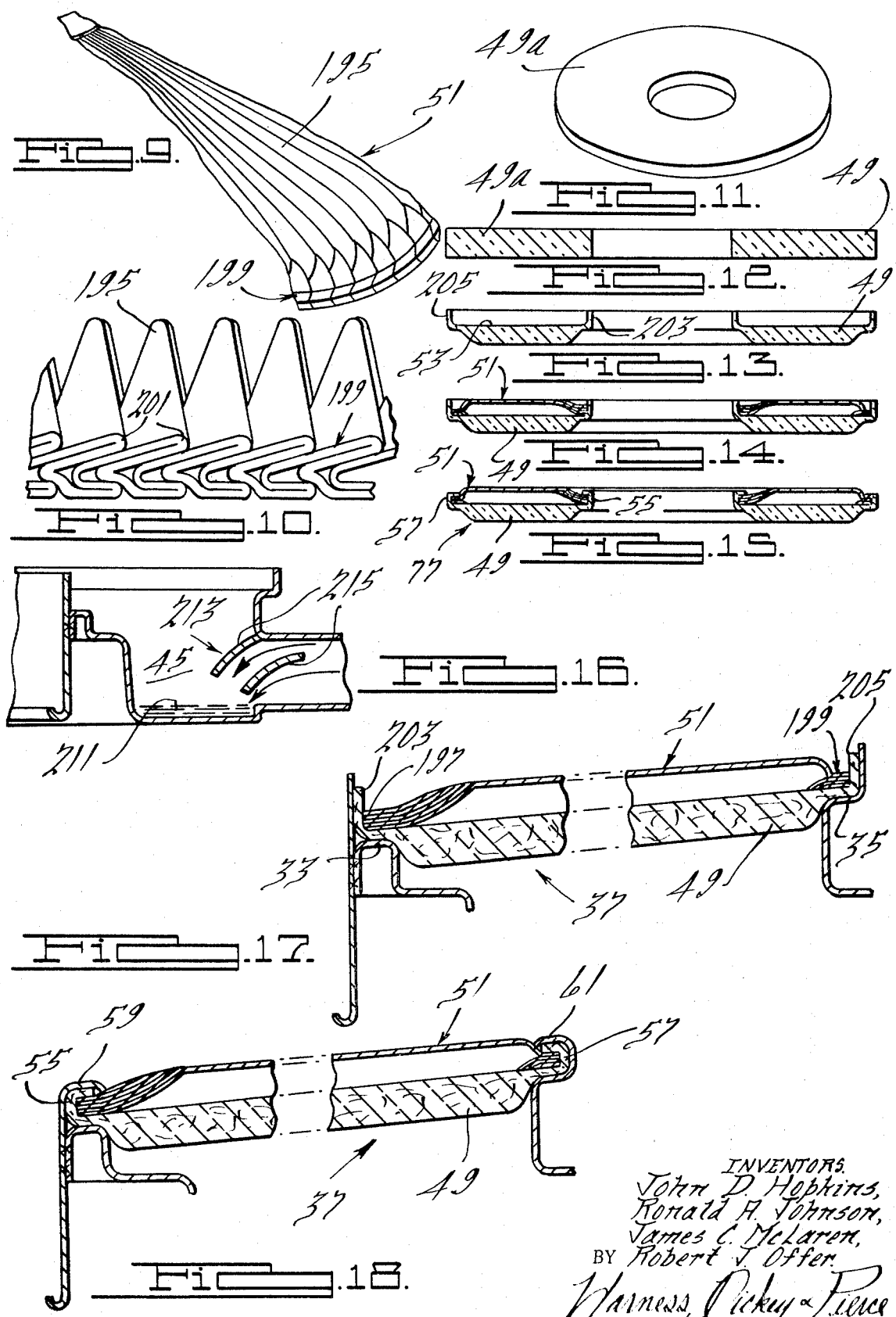

3,686,837

DUAL MEDIA AIR FILTER

BACKGROUND OF THE INVENTION

Current (1968) production air filter specifications for a major automobile manufacturer require the air filter to have a dirt-holding capacity of 200 grams of AC coarse dust, pass 320 CFM (cubic feet per minute), and be 98 percent efficient. Future specifications are expected to require the air filter to have a capacity of 500 grams, pass 500 CFM, and have a dirt removal efficiency of 98 percent. In addition, it is desired that the air filter silence incoming air noise, that it have a low overall height or flat silhouette to permit lowering of hood lines, that flexibility of housing shape or design be available so that the air filter can be adapted to the mounting and space conditions presented by different cars and models, that the filter be of a fail safe design to prevent unloading of trapped particles and/or prevent unfiltered air from flowing through the element and entering the engine, and that the filter be capable of mass production at low cost and with consistent uniformity of the individual filters.

SUMMARY OF THE INVENTION

It is the basic purpose of this invention to provide an air filter construction incorporating all the features and exceeding all the requirements set forth above.

In achieving this goal the invention matches and unites two different filter materials into a dual filter media so that each material tends to overcome inherent deficiencies in the other and so that the two materials compliment each other structurally as well as functionally.

In a preferred form, the invention includes a suitably constructed housing with inner and outer ring-like ledges to receive inner and outer joints formed in a dual filter media, the housing including means to clamp the filter joints against the ledges in an air tight manner. The dual media is of an annular pancake shape, preferably circular, and comprises a homogeneous depth media of randomly oriented, controlled size, synthetic fibers bonded together to a controlled density and porosity to form a semi-rigid body serving as the upstream section of the dual media. The downstream section of the dual media is formed of known automotive air filter paper which has been pleated and formed into an annular disc and disposed so that the pleats engage and support the outlet side of the depth section. Each of the sections is preferably about one-half inch in thickness for use to meet or exceed current automotive requirements. The joint on the filter media is preferably an interlock of a flange on the inner and outer periphery of the depth media over compressed, crushed inner and outer flanges formed in the ends of the pleats. The depth section may be saturated with a suitable impingement liquid and inertial separation elements of a known type may be used on the upstream side of the filter media to assist in filtering the solid contaminants from the incoming air. The air filter may be constructed in throwaway fashion whereby the entire housing and filter media are discarded after prolonged use or as a replacement type in which the cover of the housing may be removed to permit changing of the dual media alone.

Generally, the invention provides an air filter in which a suitably shaped and constructed housing supports a dual filter media arranged so that the incoming air must first flow through a depth media to provide for removal of a high percentage of solid particles and reduction in velocity of the remaining particles and then, in series, flow through a paper-type material which removes the remaining, finer, dirt particles with a high degree of efficiency and which serves also as a fail-safe device in the event of failure or unloading of the depth element.

More specifically, the invention provides an air filter that has an upstream section formed of a depth filter material with a high dirt-holding capacity and a downstream section formed of a filter material, such as paper, having a high dirt removal efficiency and constructed in such a way (e.g., by pleating) as to furnish mechanical support for the depth material and inhibit its natural flexibility and tendency to lose contaminants. The edges of the two filter materials are connected in a sealed joint which is preferably formed by compressing the ends of pleated sections in the paper and surrounding them with a compressed flange formed around the edges of the depth material. The sealed joint then serves as a means for mounting and sealing the dual media in a suitable housing.

DESCRIPTION OF THE DRAWINGS

FIG. 1 is a cross section of a throwaway type air filter embodying the invention shown in installed position on the air inlet tube of a carburetor which has been broken away in the drawings;

FIG. 2 is a view similar to FIG. 1 but showing a replacement type air filter wherein the filter media can be removed and replaced with a fresh unit by dismantling of the filter housing;

FIGS. 3, 4, and 5 are one-half sections of different filter configurations showing the dual media of this invention arranged in different positions;

FIG. 6 is a perspective view of the paper filter used in the dual media of this invention;

FIG. 7 is a cross section along the line 7—7 of FIG. 6;

FIG. 8 is a cross section similar to FIG. 7 showing the inner and outer peripheries of the pleated paper element after they have been compressed preparatory to being joined with the depth element;

FIG. 9 is a perspective view, broken away, looking at the top of filter element of FIG. 8 to show the rim at the outer periphery formed by compressing the pleats of a pleated element;

FIG. 10 is an enlarged developed view of a side of a portion of the compressed outer periphery of the pleated element;

FIG. 11 is a perspective view of the depth element used in combination with the pleated paper element;

FIG. 12 is a cross section somewhat enlarged of the depth element of FIG. 11;

FIG. 13 is a cross sectional view similar to FIG. 12 but showing its shape after it has been compressed to form axially extending flanges on its inner and outer periphery for cooperation with the compressed rims on the pleated paper element;

FIG. 14 is a cross sectional view showing the pleated paper element inserted within the flanges on the depth element;

FIG. 15 is a view similar to FIG. 14 but showing the flanges on the depth element turned over and compressed against the rims on the pleated element to form an assembly that may be used as a replacement dual media filter;

FIG. 16 is a half cross section through the shroud or bottom housing and the center outlet tube of a throwaway type air filter unit prior to insertion of the dual media;

FIG. 17 is an enlarged view of the structure of FIG. 16 showing the dual media in place but not yet united in a tight joint; and FIG. 18 is a view similar to FIG. 17 showing the completed joint.

DETAILED DESCRIPTION OF THE INVENTION

A typical carburetor inlet tube 1 is illustrated in FIGS. 1 and 2 and it is open at its top 3 to receive air for mixture with the fuel to form the air fuel mixture that is to be furnished to an internal combustion engine. The top end of the tube 1 is provided with a shoulder on with is seated a gasket 5 that may be used to engage and seal the curled outlet tube portion 7 of an air filter unit through which the air passes prior to reaching the carburetor inlet opening 3. In a typical engine the carburetor inlet tube 1 will be provided with a fixed block 9 that supports an upwardly projecting attachment bolt 11 which is generally coaxial with the tube 1. The bolt 11 is threaded at its upper end and projects through an opening formed in the cover of the air filter so that tightening of the wing nut 13 on the bolt 11 will press the air filter unit tightly against the gasket 5 and form a suitable seal that will prevent bypassing of air around the filter.

In FIG. 1 the air filter unit 21 is of the disposable or throwaway type which is completely discarded when the filter media contained within it becomes sufficiently contaminated so that the filter is no longer satisfactory. The unit 21 has a housing which comprises an upper section or cover 23, a lower section or shroud 25 and a central outlet tube 27 which provides the outlet edge 7 that cooperates with the gasket 5. The bottom housing section or shroud 25 has an axial flange 29 on its inlet periphery and this is spot-welded to an intermediate portion of the tube 27 as indicated at 31. Adjacent the flange 29 the shroud 25 is formed to provide a ledge 33 and this ledge on the inner periphery of the housing acts in conjunction with a ledge 35 adjacent its outer periphery to form a support for the dual filter media 37. Extending away from the ledge 33 is an inner side wall 39 and from the ledge 35 an outer side wall 41. The side walls 39 and 41 are joined by the bottom wall 43 and define an inlet chamber 45 located beneath the media 37 and receiving air through a suitable inlet such as a snorkel 47. The chamber 45 also serves to collect particles of dirt that are removed from incoming air by the filter media and which do not remain trapped in the media.

Media 37 comprises a depth type filter element 49 on the upstream side and a pleated paper element 51 on the downstream side and which engages and furnishes support for the element 49 by contact with its outlet face 53. As will be more fully described, the inner and outer peripheries of the elements 49 and 51 are compressed together in joints 55 and 57 and the bottom sides of these joints engage the ledges 33 and 35 of the shroud 25. In the throwaway type air filter unit 21 the center tube 27 has a flange 59 at its top end which is turned over and compressed against the top of the joint 55 to hold it tightly in leak-proof fashion on the ledge 33. Similarly, the outer periphery 41 of the shroud has a flange 61 which is turned over and compressed against the top of the joint 57 to hold it in a leak-proof relationship with the ledge 35.

The throwaway unit 21 is completed by permanent attachment of the cover 23 to the outer side 41 of the shroud 25 by turning over its outer periphery 63 around the ledge section 35 and underneath it as seen at 65 and compressing the entire joint together in a tight assembly.

Air enters through the inlet tube 47 and passes first through the depth media 49 and then through the pleated paper media 51 to enter the outlet chamber 67 and then flow into outlet tube 27 from which it can flow into the inlet tube 1 of the carburetor.

In FIG. 2 an air filter 71 is illustrated which is constructed in such a manner that the cover 73 may be removed from the bottom housing or shroud 75 upon unscrewing of the wing nut 13, thus permitting the dual filter media 77 to be taken out of the lower housing 75 and a new one inserted. Functionally, the dual media 77 is the same as the media 37 but the formation of the sealing rims at the inner and outer edges may be done differently if desired, as will be described later.

In the construction of the replaceable type air filter of FIG. 2, the bottom housing 75 has an outer wall 79 which includes an outwardly directed radial flange 81 that serves as a ledge to receive the outer rim of the filter media 77. The outer wall 79 is integral with a bottom wall 83 and this is integral with an inner wall 85 that is reversely curved at 87 so that it also acts as an outlet tube 89, the bottom end of which is reversely turned at 7 to engage the gasket 5. Spot-welded at 91 to the top of the reversely bent wall 87 is a stepped filter element support member 93 that is provided with a horizontal ledge 95 and a vertical wall 97, the ledge 95 receiving the inner rim on the dual media 77.

The cover 73 has an outer flange 99 that is of substantially the same diameter as the outer periphery of the ledge 81 and adjacent the shoulder 99 and extending at right angles to it is a shoulder section 101 which engages the top edge of the outer dual media joint 103 (corresponding to joint 57) and presses it tightly against the ledge 81 to prevent leakage at the joint. The inner peripheral joint 105 of the dual media 77 is held tightly on the ledge 95 by a compression ring 107 which has arms 109 connected to the cover 73 so that the ring 107 is forced tightly on the joint 105 when the wing nut 13 is tightened.

In each of the air filter units 21 and 71 the dual media is disposed so that measured in a clockwise direction from the axis of the unit the inlet face makes an angle of less than ninety degrees. FIGS. 3 and 4 show arrangements in which this angle is greater than and equal to 90°, respectively, and these figures along with FIG. 5 show that the specific structure of the air filter unit housing may be modified to some extent from the structures illustrated in FIGS. 1 and 2 without departing from the invention. In FIG. 3, the air filter unit 111 has a cover 113 which includes an air inlet snorkel 115 and an outer flange 117 which prior to bending in the radial direction is axial as indicated by the phantom lines. The lower housing section 119 has a ledge section 121 to receive the outer peripheral joint on the dual filter media 123 and includes a flange 124 that is turned over and compressed against this joint to secure it tightly to the ledge 121. The inner periphery of the bottom section 119 is turned to form the outlet tube 125 and this is provided with the bottom rim 7 for engaging gasket 5. Axially extending support members or pins 127 are secured to the wall of the bottom housing 119 and carry an annular L-shaped seat 129 for the inner periphery of the dual media 123 including the ledge 131. When the flange 117 is turned underneath the ledge 121 a depressed section 133 of the cover 113 will press against the inner peripheral joint of the dual media 123 to hold it against ledge 131 in an air tight joint.

FIG. 4 illustrates another type of throwaway air filter unit 141 in which the bottom housing or shroud 143 has an outlet tube section 145 provided with the turned over rim 7 for engaging the gasket 5. Its outer wall 147 is provided with a snorkel inlet tube 149 as well as a ledge 151 to receive the outer peripheral joint on the dual filter media 153. A top portion of the outer wall 147 is reversely bent in a flange 155 on top of the outer peripheral joint of the dual media 153 to hold it tightly against the ledge 151. The inner peripheral joint on the dual media 153 is supported on a ledge 157 that is formed in a stepped tube 159 which is spot-welded at 161 to a support surface on the inner wall of the bottom housing 143. The member 159 has a flange 163 which is turned over the top of the inner peripheral joint of the dual media 153 to hold it tightly against ledge 159 and act along with flange 155 to provide permanent inner connection. The cover 141 is permanently connected to the bottom housing 143 by means of the turned over outer flange 165 which engages the bottom of the ledge 151, a radial section 167 on the cover pressing against the flange 155 when the assembly is made.

In FIG. 5 the air filter unit 171 has a cover 173 and a lower housing section 175 which is provided with an outer wall 177 that has an inlet snorkel 179. The outer wall 177 is provided with a radial ledge 181 that receives the outer peripheral joint on the dual media 183, the joint being pressed against the ledge 181 by the turned over flange 185 at the upper part of the outer wall 177. The inner peripheral joint of the dual media 183 is supported on a ledge 187 that is formed by a rebend on the inner periphery of the bottom housing 175, an axial section form the rebend being spot-welded to the outlet tube 189 which has the rim 7 at its lower edge. The top of the outlet tube 189 has a bent over flange 191 which presses against the inner peripheral joint of the dual media 183 to hold it on the ledge 187. The cover 173 is permanently secured to the lower housing section 175 by means of the flange 193 which is turned around beneath the ledge 181, the top surface of the cover 173 bearing on and pressing against the flange 185 as seen in FIG. 5.

Referring to FIGS. 6 to 10, the non-woven or paper-type element 51 is preferably formed by first putting the desired number of pleats 195 into an elongated strip of paper about 6 inches wide and then fanning the paper around into a complete circle (on about a 5½-inch inner diameter for one major automotive application) so as to form the annulus of FIG. 6, the two ends being secured together by clips, glue or other suitable means to retain the annular shape. The pleats 195 extend radially and have alternating apices on the inlet and outlet sides of the element 51. The inner and outer radial ends of the pleats are folded and flattened (FIG. 10) to provide an annular inner rim 197 and an annular outer rim 199 of, preferably, three-eights to one-half inch width. This can be done by applying axially inch directed compression to the inner and outer edges of the pleated disc. Preferably, such compression is accomplished by the application of heat in the case of filter paper so that resin contained in the paper will be advanced to its cured state and serve to hold the nested, crushed, and folded sections 201 together in a unitary rim 197 or 199. If desired, a suitable adhesive or air filter plastisol may be incorporated in the material of the rims 197 and 199 to adhere the crushed pleat ends together though this is not considered necessary if a resin treated paper is used to form the air filter.

The particular paper for making element 51 is available on the open market and known as air filter paper for use in automotive engines. It has a high relative retention and low restriction. The paper is composed of cellulose fibers impregnated with phenolic resin to the extent of approximately 20 to 25 percent of the paper weight, the basic weight being approximately 80 pounds per 3,000 square feet. Our preferred paper has a thickness of about 30 mils, a burst test strength (Mullen test) of about 6 psi, and a Frazier air flow of about 90 cfm per square foot at one-half inch of water pressure drop across the paper. Preferably, the pleats are one-half inch high and the width of the disc from the inner periphery to the outer periphery is 6 inches with 250 to 300 pleats formed in it giving a total filter area of 1,500 to 1,800 square inches.

As seen in FIGS. 11 to 13, the depth element 49 consists of a relatively thick mat 49a formed of controlled and selected diameter synthetic fibers which are bonded into a semi-rigid mass having a preselected and controlled density, porosity, and resistance to flow. Preferably, the fibers are uniform diameter viscose rayon coated with phenolic resin which is cured to bond the respective fibers together at their points of intersection. Alternately, synthetic fibers of the self-bonding type (such as polyesters) could be used. The fibers within the element 49 are randomly oriented so that the element is homogenous throughout. Our preferred fiber size is 15 denier, though sizes up to 40 denier have been used advantageously. Mixtures of fibers can be used. However, we strongly prefer process controls so that uniformity of density, porosity, and resistance in successively formed elements 49 is obtained in mass production and this is best obtained by using preselected uniform diameter synthetic fibers (natural fibers are not uniform diameter) in preselected quantities by weight which are randomly oriented and homogenously mixed and compressed to a predetermined and preselected density to obtain a preselected and predetermined porosity and flow resistance. We prefer the density to be in the range of 0.30 to 0.42 grams per cubic inch and the percent by weight of phenolic resin fiber coating to be from 30 to 40 percent.

The annulus or ring of FIG. 11 is of uniform thickness, preferably one-half inch, and may be individually molded or cut from a mat or bat that suitably formed to meet the requirements of controlled and preselected density, etc., mentioned above. The ring 49a in the uncured state of FIGS. 11 and 12 is preferably placed in a suitable heated mold where it is compressed to the preselected thickness (resulting in the preselected uniform density) and formed into the shape of FIG. 13 in which inner and outer axially extending peripheral flanges 203 and 205 projecting from the outlet face 53 are provided. The element is preferably cured in the shape shown in FIG. 13 leaving it semi-rigid throughout its radial width as well as in the axial flanges 203 and 205.

For a replacement type dual media 77 (FIG. 2) the paper filter 51 of FIGS. 8 to 10 is placed on the surface 53 and the flanges 203 and 205 are folded inwardly, over the paper filter rims 199 and 197, preferably with the application of heat and pressure, to form the joints 55 and 57 as seen in FIGS. 14 and 15. If desired a suitable adhesive may first be placed on the surfaces of the paper rims 197 and 199 to facilitate adherence of the two materials. The resulting joints 55 and 57 are resilient and adapted to provide dirt-proof seals when squeezed in place in the air filter housing.

For a permanent type air filter assembly for media 37 (FIG. 1) the paper element 51 may be inserted within the flanges 203 and 205 as seen in FIG. 14 and then placed on the ledges 33 and 35 of the air filter housing as seen in FIG. 17. The housing sections 59 and 61 are then bent inwardly thereby bending the flanges 203 and 205 tightly against the paper rims 197 and 199 to form compressed joints 55 and 57 held in squeezed condition by the metal sections 59 and 61.

In either arrangement of FIG. 15 or FIG. 18 it is apparent that an acceptable type resilient compression seal is obtained from the air filter media materials themselves by means of joints or rims 55 and 57 without the need to introduce or use other sealing material or sealing elements.

Prior to interconnecting the paper element 51 with the depth element 49 the body or filter portion of the latter is preferably saturated with a suitable wettant or impingement liquid of a type well known in the air filter industry so that it functions as a viscous impingement filter as well as a depth filter. One such impingement material is a 30 weight engine oil (non-detergent) and another is R414 Wettant sold by Reynolds Chemical Company. Normally the percent of wettant by weight will be approximately 80 to 90 percent of the dry weight of the disc 49.

Referring to FIG. 16, a bath of impingement fluid 211 is shown at the bottom of the inlet chamber 45 of the air filter and an inertial separation device 213 in the form of vanes 215 affixed to the housing is illustrated to cause centrifugal flow of the incoming air as well as to direct it toward and over the surface of the impingement fluid bath 211. Heavier particles of contaminants in the air will therefore be directed into the bath and stick to the impingement liquid.

The use of the dual media comprising depth material 49 on the inlet side and air filter paper 51 on the outlet side increases the effectiveness of each material. The depth element 49 increases the life and capacity of the paper and improves its effectiveness by removing particles and by reducing the velocity of particles reaching the paper. The paper provides a high contaminant removal efficiency, a fail safe device in the event of unloading of the impingement section 49, and structural support through the bracing effect of the radial pleats on the back face 53 of the element 49 tending to prevent its flexing and consequent unloading or "walking through" of particles.

As an indication of the increase in capacity of the paper section 51 a test was performed in which a ½-inch thick dry viscose rayon element 49 was used in conjunction with a paper element 51 having 300 pleats and one-half inch high. The paper element had a capacity of 375 grams of dust. When an identical amount of paper was used with no viscose mat on the upstream side, the paper had a capacity of only 75 grams. Thus, when used in conjunction with the viscose rayon element the paper's capacity is greatly increased so that it becomes a prime factor in meeting automotive manufacturers' dust capacity tests.

When tested according to a major automobile manufacturer's test specification, the described dual media with impingement liquid in element 49 had an AC coarse dust capacity of 850 grams and a removal efficiency about 99 percent and would pass more than 500 CFM. The current tentative future requirement for that manufacturer is a 500 gram AC capacity and 98 percent efficiency and a 500 CFM flow rate. The current production requirement is 98 percent efficiency, a 200 gram AC capacity, and a flow rate up to 320 CFM. Thus, it is apparent that the present media is far better than current air filters and much better than tentative future requirements for that particular automobile manufacturer. The media also appeared to be satisfactory acoustically without the need for additional silencing means in the air filter assembly. The assembly, itself, is about one inch lower in height than the presently used unit but has much better performance.

Variations in the specific structures and compositions described are within the broad principles of the invention. For example, instead of circular, the unit could in some instances be square or of a different shape. Different functional requirements or test specifications may enable the element 51 to be made of other non-woven material and the element 49 to be made of different fibers or blends of fibers. It is also noted that the element 51 may in some cases be used alone and in these instances the invention provides a useful means for sealing its inner and outer periphery.

We claim:

1. An air filter assembly having a flat silhouette and adapted for use on automotive internal combustion engines comprising a housing having a vertical axis and a height along said axis that is relatively small compared with the width of the housing transverse to said axis, said housing having a tubular wall means providing central outlet passage substantially coaxial with said axis and first housing wall means providing an annular air inlet chamber disposed around and substantially concentric with said outlet passage, said air inlet chamber having an inlet for air to be filtered, said housing having second housing wall means providing an air outlet chamber communicating with said outlet passage, said housing including inner and outer annular seats and an annular pancake shaped filter body supported on said seats and separating the inlet chamber and the outlet chamber, said filter body being substantially coaxial with said vertical axis and having a height in the direction of said axis that is relatively small compared with the width of the filter body transverse to the axis, the transverse distance between said inner and outer seats being relatively large compared with the vertical height of said filter body and the transverse width of the body between said inner and outer seats being unsupported, the inlet side of said body extending transversely between said inner and outer seats being exposed to the pressure of incoming air, said filter body comprising an inlet upstream section and a downstream outlet section each extending across the full width of the filter body and engaging each other on a surface defined by the outlet side of the inlet section of the body, the inlet side of said body comprising inlet side of said inlet section and said inlet side being substantially parallel to said outlet side, said inlet section comprising a semi-rigid pad-like homogeneous porous body formed of synthetic, controlled and predetermined diameter fibers bonded to each other and having a predetermined substantially uniform thickness, density, and porosity throughout and in the absence of a support means being subject to flexing in the direction of said vertical axis as a result of air pressure on it, said body having a high dirt-holding capacity and serving as a depth type filter, said outlet section comprising a body of substantially uniform thickness air filter paper having a high dirt removal efficiency and a relatively low dirt-holding capacity compared with the inlet section and having a relatively thin thickness compared with the inlet section, said outlet section paper being pleated with the pleats extending transversely to said vertical axis and across substantially the full width of the filter body and the apices of a multitude of said pleats engaging the outlet side of said inlet section so that said outlet section acts as an anti-flexing support means for said inlet section, said inlet and outlet section bodies having compressed inner and outer peripheral flanges connected together to form inner and outer resilient annular rims, said inner and outer rims engaging said inner and outer annular seats, and first and second clamping means in said housing respectively clamping said inner and outer rims to said inner and outer seats to form air tight squeeze seals between said filter body and housing to prevent by-passing of air from the inlet to the outlet chamber.

2. An air filter assembly as set forth in claim 1 wherein said second housing wall means comprises a cover permanently secured to the first housing wall means so that the assembly as a whole is disposable after use of the filter body.

3. An air filter assembly as set forth in claim 1 wherein the second housing wall means comprises a cover removably secured to the first housing wall means, said filter body being removable from the housing upon removal of the cover.

4. A dual media air filter comprising a substantially flat pad-like fibrous body of annular cross section and having a central axis and annular inlet and outlet substantially flat parallel faces extending transversely to said axis, annular flanges formed in the material of said body around the inner and outer peripheries, and a sheet of air filter paper of annular configuration engaging the outlet face of said body and having inner and outer peripheral edges in juxtaposition with the annular flanges, said flanges being reversely bent over the peripheral edges of said paper, means joining said edges and flanges together to unite the fibrous body and paper into a common air filter member, said reversely bent flanges providing resilient mounting rims for sealing and securing the member in an air filter housing.

5. A dual media air filter comprising a pad-like fibrous body having substantially parallel and planar inlet and outlet faces and being of substantially uniform thickness and density throughout between said faces and forming a depth-type upstream air filter, said body being semi-rigid and subject to flexing as a result of air pressure on its inlet and outlet faces, a body of pleated air filter paper type material having pleat edges extending substantially parallel to the outlet face of said pad-like body and a multitude of said pleat edges engaging said outlet face to support said pad-like body against flexing, each of said bodies having integral peripheries of reduced thickness as compared with the overall thickness of the respective bodies and forming substantially uniform thickness rims extending around their entire peripheries, the rims of the two bodies being joined together to form a peripheral joint uniting the two bodies into a common air filter member having a depth type upstream section and a paper type downstream section and serving as a means for mounting the member in an air filter housing.

6. The method of making a dual media filter which comprises forming a fibrous filter pad of substantially uniform thickness in the direction of fluid flow, forming a flange from said pad around its outer periphery by compressing the outer edge portion of the pad relative to the inward portions, forming a pleated sheet of filter paper, forming a rim around the outer periphery of the paper by crushing the ends of the pleats and folding and nesting them together, placing the rimmed sheet of pleated paper on the pad inside the flange on said pad and bending and compressing the flange over the rim and uniting the pad and paper.

7. A method as set forth in claim 6 including placing the pleated paper on the pad so that apices of alternate pleats engage one face of the pat.

* * * * *